United States Patent

[11] 3,540,503

| [72] | Inventor | Eric P. McNair |
| | | 350 N. Milwaukee Ave., Libertyville, |
| | | Illinois 60048 |
| [21] | Appl. No. | 746,626 |
| [22] | Filed | July 22, 1968 |
| [45] | Patented | Nov. 17, 1970 |

[54] FOOD PROCESSING TOOL
6 Claims, 5 Drawing Figs.

[52] U.S. Cl. .................................................. 146/6,
146/203; 30/301
[51] Int. Cl. ...................................... A47j 43/26;
B26b 3/00
[50] Field of Search ............................. 146/6, 203,
40, 52, 159, 160; 30/301

[56] References Cited
UNITED STATES PATENTS
| 1,060,750 | 5/1913 | Ginaca ........................ | 146/6 |
| 2,046,540 | 7/1936 | Anello et al. ................. | 30/301 |
| 2,478,571 | 8/1949 | Creider ....................... | 30/301 |
| 2,525,604 | 10/1950 | Johnson ....................... | |

FOREIGN PATENTS
| 73,161 | 3/1948 | Norway ....................... | 146/160 |

Primary Examiner—Willie G. Abercrombie
Attorney—Molinare, Allegretti, Newitt & Witcoff ABSTRACT: A food-processing tool particularly for coring and peeling a pineapple. A first upright substantially circular cutting blade and a second upright substantially circular cutting blade are spaced apart and are concentric with each other. A first support member is secured to the first cutting blade and a second support member is secured to the second blade. The support members are joined rigidly together at their upper ends so as to define a handle for a person's hand.

Patented Nov. 17, 1970
3,540,503
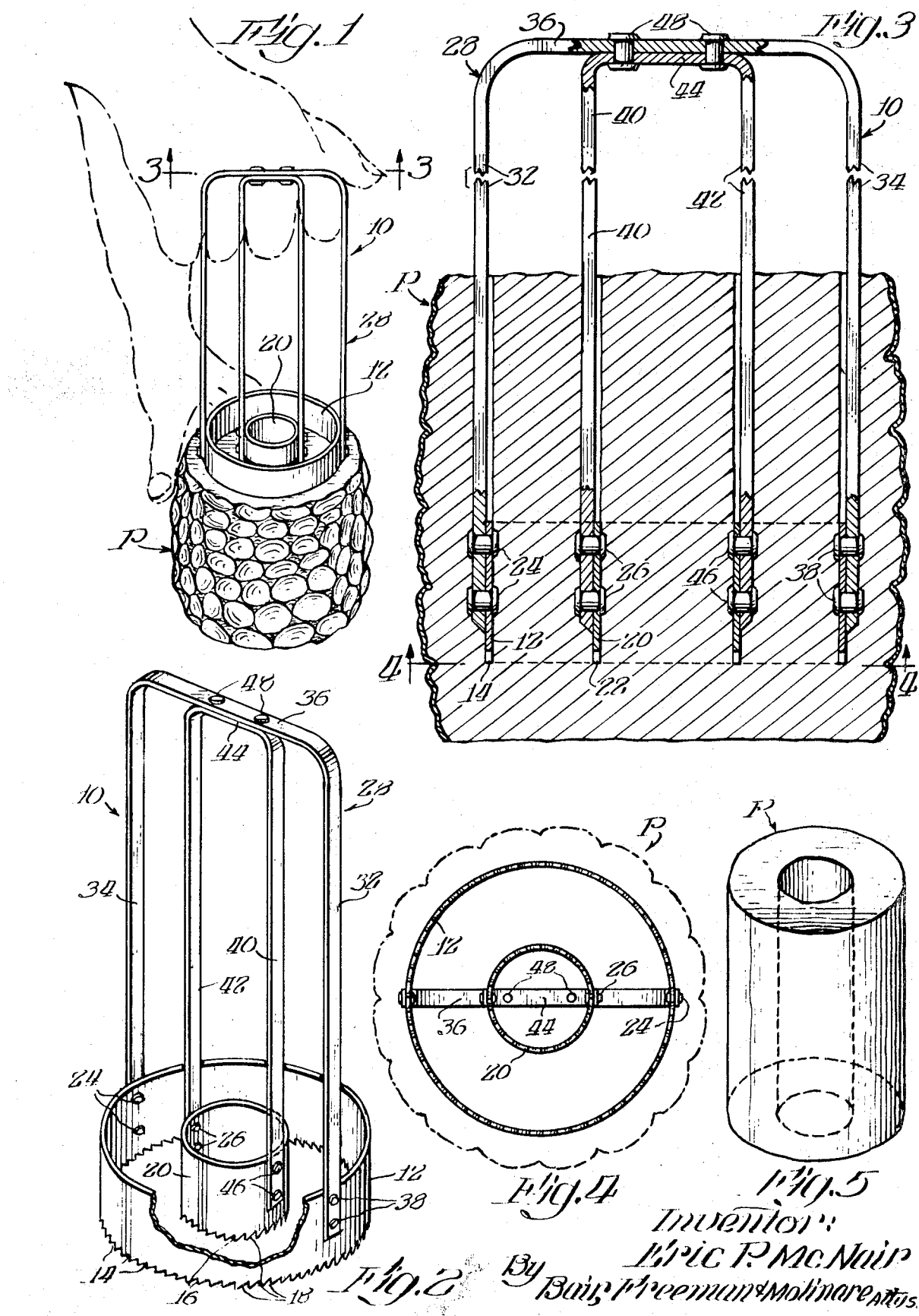

FOOD PROCESSING TOOL

BACKGROUND OF THE INVENTION

Field of the Invention and Description of the Prior Art

This invention relates to a food-processing tool and it particularly relates to a food-processing tool which is particularly useful for cutting, coring, and peeling a whole fresh pineapple.

One of the most difficult of all fresh foods to process for consumption is a pineapple. In order for a person to enjoy a fresh pineapple in his home, it is necessary for him to perform some difficult hand operations on the pineapple. First, it is necessary for him to slice off the top of the pineapple, which usually presents no real problem. However, problems arise when it comes to (1) remove the tough skin off the pineapple and (2) core the pineapple. The tough skin must be removed with a conventional flat knife, which is the only tool usually available in the ordinary kitchen. Even a sharp knife does not really solve the problem because the knife can be expected to become dull even after processing a single pineapple.

Even if a person is successful in taking off the top and taking off the skin of the pineapple, the appearance is not pleasing and generally has a rather "butchered" appearance. Since a pineapple usually is consumed after the core is removed, the next required operations involve slicing the skinned pineapple into slices, which are then individually cored. The coring operation on each slice is not only time-consuming, but also the final skinned, cored slice does not even remotely resemble a canned pineapple slice in aesthetic appearance.

Because of the great difficulty in cutting a pineapple and because the result of the operation does not even result in a slice that is pleasing in appearance, people have generally resorted to purchasing canned pineapples rather than fresh pineapples. As true with practically any fresh food, the taste of a fresh pineapple is generally superior to a canned pineapple. Although large and expensive machines for processing pineapples are known, one only needs to go into a kitchen supply store and find that there is no food-processing tool which is highly useful for cutting, coring and skinning a whole fresh pineapple.

SUMMARY OF THE INVENTION

It is therefore an important object of this invention to provide a food-processing tool which is particularly useful for cutting, peeling, and coring fresh pineapple.

It is also an important object of this invention to provide a food-processing tool for cutting pineapples wherein the cutting device is particularly characterized by its simplicity and economy in construction, manufacture, and operation.

It is a further object of this invention to provide an improved pineapple-cutting tool which provides for simultaneously peeling and coring a pineapple with a single manual operation.

It is still another object of this invention to provide a pineapple-cutting tool which comprises an inner cutting blade, an outer cutting blade, and a handle for rigidly spacing the blades apart so as to provide a structure which conveniently and readily slices the peel off of a pineapple at the same time it is cored.

Further purposes and objects of this invention will appear as the specification proceeds.

All of the foregoing objects are provided by my improved food-processing tool wherein the tool generally comprises a first upright, substantially circular cutting blade, a second upright, substantially circular cutting blade, the second blade being spaced inwardly of and substantially concentric of the first blade, a first upright support means secured to the first upright blade, second upright support means secured to the second upright blade, the first and second support means being spaced apart a distance substantially equal to the space between the first and second blades, and cross support means for rigidly joining the upper ends of each of the upright support means.

BRIEF DESCRIPTION OF THE DRAWINGS

Referring to the accompanying drawings, a particular embodiment of the present invention is illustrated, wherein:

FIG. 1 is perspective view showing my novel food-processing tool as it enters a pineapple for slicing off the peel and for cutting out the core;

FIG. 2 is an enlarged detailed perspective view of the preferred form of my improved pineapple-cutting tool;

FIG. 3 is an enlarged, cross-sectional view through a pineapple as my pineapple-cutting tool is passing therethrough;

FIG. 4 is a reduced cross-sectional view showing the cutter in a pineapple, taken along the line 4-4 of FIG. 3; and FIG. 5 is a perspective view of a peeled and cored pineapple after the use of my novel pineapple-processing tool.

DETAILED DESCRIPTION OF THE PREFERRED EMBODIMENT

Referring to the drawings, and particularly to FIG. 1, the improved pineapple cutter, generally 10, of my invention is shown entering the top of a pineapple P. When the top of the pineapple P has been removed by slicing it off in a direction transverse to the axis of the pineapple, my cutter 10 is ready for use in peeling and coring the pineapple.

Referring particularly to FIG. 2, the preferred form of my invention is shown in detail. An outer substantially upright cutting blade 12, circular in shape, is provided on the cutter 10 for the purpose of slicing off the skin or peel of the pineapple P. The outer blade 12 is a saw blade having saw teeth 14 at the lower edge. Preferably, the saw teeth 14 are of a specific design so as to enable the cutter to be particularly effective in cutting through the pineapple with a single operation. As shown best in FIG. 2, the saw teeth 14 are each defined by an upright edge 16. The upright edge 16 is parallel to the axis of the upright circular blade 12. In this preferred construction, the upright edge acts as the cutting edge to provide for increased cutting strength. In use, as shown in FIG. 1, the cutter 10 is preferably rotated in the direction of the upright edge 16 during the entire traverse of the cutter 10 through the pineapple P. Since the cutter 10 is used with food, the blade 12 and all the structural parts of the cutter 10 are made of stainless steel.

An inner substantially circular upright cutting blade 20 is spaced inwardly of the outer blade 12 and is substantially concentric and aligned therewith. The purpose of the inner blade 20 is to effect removal of the core from the pineapple P. The saw teeth 22 on the inner blade 20 are preferably formed in the same way as the teeth 14 on the outer blade 12. The upright edge 16 on each of the saw teeth 14 and 22 always face in the same direction so that as the operator rotates the cutter 10 in the direction of the upright edge 16, both the inner blade 20 and the outer blade 12 perform the necessary cutting operations on the pineapple P.

For purpose of economy, both the inner blade and outer blade are constructed of exactly the same blade material and are formed in the continuous circular form. The opposite ends of each of the blades 12 and 20 are secured together by a pair of rivets 24 and a pair of rivets 26. The rivets 24 and 26 also act to secure the outer blade support, generally 28, to the blade 12 and to secure the inner blade support, generally 30, to the inner blade 20.

The outer blade support 28 is generally in the shape of an inverted U and includes a first leg 32, a second leg 34, and a crossmember 36 for integrally joining the first and second legs 32 and 34. Desirably the blade support 28 is from a singular piece of flat stainless steel material. The blade support 28 is secured at diametrically opposite positions to the outer blade 12. The rivets 24 secure the opposite ends of the blade 12 together and, at the same time, they secure the lower end of the first leg 32 to the blade 12. The lower end of the second blade 34 is secured to the opposite side of the blade 12 by a pair of rivets 38. The support 28 is relatively flat so as not to cause any significant resistance to the cutting operation. Furthermore, the blade support 28 is preferably secured to the outer surface of the blade 12 so that it does not adversely affect the external appearance of the cut pineapple section shown in FIG. 5.

The blade support 30 for the inner blade 20 is constructed in substantially the same way as the blade support 28. The blade support 30 is also in the shape of an inverted U and is constructed of a stainless steel material which is of minimal thickness so as not to significantly resist the rotating cutting movement of the cutter 10. Blade support 30 includes a first leg 40, a second leg 42, and a cross support 44 which rigidly joins the upper ends of the first and second legs 40 and 42 together. The support is preferably formed in a single integral piece. The lower end of the first leg 40 is secured by the rivets 26 to the blade 20, the rivets 26 also secure the opposite ends of the blades together. The opposite leg 42 is also secured in a diametrically opposite position to the blade 12 by the rivets 46. It is important to join the crossmembers 36 and 44 together by a pair of rivets 48 so that the support frame 28 and support frame 30 are rigidly joined together at their top or bridging portions whereby the inner and outer blades are held apart at a substantially fixed distance and are held in concentric relationship.

Referring particularly to FIG. 1, the cross supports 36 and 44 cooperate to define a handle. Three spaces are defined below the handle at the upper ends of the supports 28 and 30 and receive the fingers of a person's hand. These spaces are defined between the legs of the outer support 28 and the legs of the inner support 30, and between the two legs of the inner support 30. These three spaces permit a person to grasp the handle portion defined by the crossmembers 36 and 44 and conveniently insert his fingers into the spaces defined by the legs. A person may thus rigidly and positively grip the cutter 10 and the bridging portion defined by the crossmembers 36 and 44.

The vertical spacing between the cutting edges 14 and 22 and the handle portion defined by the crossmembers 36 and 44 is to be of a height which is at least equal to the height of a pineapple with the top removed, plus space for permitting the passage of a person's fingers underneath the crossmembers 36 and 44. In this way, a pineapple may be cut in a single stroke and in one direction.

It has been seen from the foregoing description of the cutter 10 that all of the objects previously set forth have been accomplished. It is now possible for a person, in his own kitchen, to take a fresh pineapple P, such as shown in FIG. 1, and readily make a pineapple section, such as shown in FIG. 5. This is accomplished by a simple and effective manner with the use of my cutter 10. Although the description of the cutter 10 has been specifically directed to use with a pineapple P, it is to be understood that the pineapple cutter 10 may be used for other cutting operations. For example, the inner cutting blade 20 is effective for removing the core from an apple or the like.

While in the foregoing, there has been provided a detailed description of a particular embodiment of the present invention, it is to be understood that all equivalents obvious to those having skill in the art are to be included within the scope of the invention as claimed.

I claim:

1. A manually operated food-processing tool primarily useful for cutting pineapples, said tool comprising, in combination, a first upright cutting blade having a substantially circular cross section transverse thereof, a second upright cutting blade having a substantially circular cross section transverse thereof, each of said blades having a lower cutting edge and an upper edge, said second cutting blade being spaced substantially uniformly inwardly of said first blade to define a substantially uniform annular space between said blades, said blades being unconnected in said annular space, first upright elongated support means secured to said first upright blade, second upright elongated support means secured to said second upright blade, said first and second support means being spaced apart a distance substantially equal to the said annular space between said first and second blades, said support means each being secured to said blades in a distance relatively small as compared to the circumference of each of said blades and each of said support means having a thickness relatively small as compared to the circumference of each of said blades, and cross support means for rigidly joining the upper ends of each of said upright support means, said cross support means being the only interconnection between said first and second support means, the distance between said lower blade edges and said upper blade edges being relatively small as compared to the distance between said upper blade edges and said cross support means.

2. The device of claim 1 wherein said cutting blades are aligned with each other in a horizontal plane and are substantially concentric with each other.

3. The device of claim 1 wherein the lower edges of each of said upright cutting blades comprise saw-cutting edges, said saw teeth each comprising an upright blade edge and a slanted edge, the upright cutting edge providing greater cutting force than said slanted edge.

4. The device of claim 1 wherein each of said cutting blades comprises a stainless steel, cutting blade rigidly joined together at their opposite ends to form a continuous circular blade.

5. The tool of claim 1 wherein said first upright support means comprises a pair of spaced upright legs, said second support means comprises a pair of spaced upright legs, said cross support means comprises separate means rigidly joining the upper ends of each pair of said upright legs, and means for securing said separate means together, said cross support means and said upright legs defining handle means for receiving at least three fingers of a person's hand.

6. The tool of claim 1 wherein said first upright support means comprises inverted U-shaped continuous rigid member secured to said first upright blade at diametrically opposite positions, and said second upright support means comprises an inverted U-shaped continuous rigid member joined at diametrically opposite positions to said second upright blade, the bases of each of said inverted U-shaped support members being rigidly joined together so as to define said cross support means.